United States Patent
Chu et al.

(10) Patent No.: US 7,302,553 B2
(45) Date of Patent: Nov. 27, 2007

(54) APPARATUS, SYSTEM AND METHOD FOR QUICKLY DETERMINING AN OLDEST INSTRUCTION IN A NON-MOVING INSTRUCTION QUEUE

(75) Inventors: Sam Gat-Shang Chu, Round Rock, TX (US); Hung Qui Le, Austin, TX (US); Dung Quoc Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 10/351,556

(22) Filed: Jan. 23, 2003

(65) Prior Publication Data

US 2004/0148493 A1    Jul. 29, 2004

(51) Int. Cl.
*G06F 9/30* (2006.01)
*G06F 9/40* (2006.01)
*G06F 15/00* (2006.01)

(52) U.S. Cl. .................................... 712/214
(58) Field of Classification Search ................ 712/214
See application file for complete search history.

(56) References Cited

U.S. PATENT DOCUMENTS

| | | | |
|---|---|---|---|
| 5,745,726 A * | 4/1998 | Shebanow et al. .......... | 712/216 |
| 5,923,862 A * | 7/1999 | Nguyen et al. ............. | 712/208 |
| 5,995,743 A * | 11/1999 | Kahle et al. ................. | 703/21 |
| 6,282,637 B1 * | 8/2001 | Chan et al. ................. | 712/223 |
| 6,460,130 B1 * | 10/2002 | Trull et al. .................. | 712/32 |
| 6,609,190 B1 * | 8/2003 | Kahle et al. ................ | 712/214 |
| 6,643,767 B1 * | 11/2003 | Sato ........................... | 712/219 |

* cited by examiner

*Primary Examiner*—Eddie Chan
*Assistant Examiner*—Brian P Johnson
(74) *Attorney, Agent, or Firm*—Volel Emile; Casimer K. Salys

(57) ABSTRACT

An apparatus, system and method for quickly determining an oldest instruction in a non-moving instruction queue of a processor are provided. Particularly, instructions are stored, one at a time at a clock cycle, in the non-moving queue. At every clock cycle, a present status of the instructions in the queue is recorded. Using the present status of the instructions in the queue in conjunction with previously recorded statuses of the instructions, the oldest instruction in the queue is determined. The status of the instructions in the queue includes whether or not the instruction has been issued for execution as well as whether or not it is known that the issued instruction has been accepted for execution.

8 Claims, 15 Drawing Sheets

APPARATUS, SYSTEM AND METHOD FOR QUICKLY DETERMINING AN OLDEST INSTRUCTION IN A NON-MOVING INSTRUCTION QUEUE

BACKGROUND OF THE INVENTION

1. Technical Field

The present invention is directed generally to processors. More specifically, the invention is directed to an apparatus, system and method of quickly determining and selecting an oldest instruction in a non-moving instruction queue of a processor for issuance.

2. Description of Related Art

Most modern processors are super-scalar processors. A super-scalar processor is a processor that has multiple execution units for simultaneously processing multiple instructions. Generally, a super-scalar processor executes an instruction using a plurality of stages. These stages include: fetch, decode, dispatch, issue/execute, retirement and write-back.

In the fetch stage, instructions are loaded from memory into the processor for execution. However, since accessing data from a system memory is very slow by comparison to the execution speed of a processor, this stage does not involve a direct read from the memory. Rather, a special control circuitry loads larger blocks (16 or 32 bytes) of instruction data from the memory into a primary instruction cache. This data may then be made available for rapid feeding to the execution units as needed.

In the decode stage, a loaded instruction is examined to determine whether it should be divided into micro-instructions. As can be surmised, the amount of time it takes to decode an instruction depends on the complexity of the instruction. Simple instructions may be decoded at the rate of several per clock cycle, while more complicated instructions may take more than a cycle each. Any addresses required in memory are also generated at this stage.

In the dispatch stage, each micro-instruction or instruction is dispatched to an instruction pool or queue, where it awaits assignment to an execution unit. Internal circuitry is used to optimize this task and control which instruction or micro-instruction goes to which execution unit. This is sometimes called instruction scheduling, since tasks (micro-instructions) are assigned to available resources (execution units). Note that in order to simplify the rest of the disclosure, micro-instructions and instructions will henceforth be used interchangeably.

In the issue/execute stage, an instruction is issued to an execution unit for execution. Since multiple execution units are normally used in a super-scalar processor, some of the execution units may be dedicated to execute specific instructions. For example, complex floating-point operations are typically handled by floating point execution units. Consequently, the instructions may be executed independently and in an out-of-order fashion.

Therefore, to ensure the results of the executions of the instructions remain in their original order, they are stored in temporary locations. This allows a retirement unit to collect the results from the instructions and ensures that the output is produced correctly and in accordance with the intent of the original instructions. This occurs at the retirement stage.

In the write-back stage, the results from the execution units are written back either to an internal register or to the system memory. Again, since accessing the system memory is a rather slow process by comparison to the speed of the processor, the result is first written into a write buffer, where it is held until it can be written into the system memory.

To properly and fairly schedule the instructions in the instruction queue for issuance, the scheduler ordinarily uses one of a plurality of algorithms. These algorithms include first-in, first-out (FIFO) algorithm, last-in, first-out (LIFO) algorithm etc. In the case where the FIFO algorithm is used, the oldest instruction in the instruction queue is issued before any other one is. This generally entails that the oldest instruction be known.

Since instructions in a super-scalar processor may be executed in an out-of-order fashion, the oldest instruction in the queue may not always be known, especially when a non-moving instruction queue is in use. (In a non-moving instruction queue, new instructions are placed in any empty or available locations in the queue.) Consequently, before issuing an instruction to an execution unit, a search for the oldest instruction in the queue is generally performed.

Searching the queue for the oldest instruction is a time-consuming endeavor, which is ill-suited for high-frequency processors. Thus, moving instruction queues are typically employed in high-frequency processors. (In a moving instruction queue, the queue is compressed every cycle to ensure that empty or available locations are always at one end (e.g., at the top) of the queue.) Thus, new instructions are generally dispatched to the top of the queue. This, then, ascertains that the bottom-most instruction is always the oldest instruction in the queue.

However, compressing the queue at every cycle may consume more power than is required when searching for the oldest instruction in a queue. And, as is well known in the field, power consumption equates largely to heat generation, which degrades performance.

Thus, what is needed is an apparatus, system and method to determine quickly an oldest instruction in a non-moving instruction queue.

SUMMARY OF THE INVENTION

The present invention provides an apparatus, system and method for quickly determining an oldest instruction in a non-moving instruction queue of a processor. Particularly, instructions are stored, one at a time at a clock cycle, in the non-moving queue. At every clock cycle, a present status of the instructions in the queue is recorded. Using the present status of the instructions in the queue in conjunction with previously recorded statuses of the instructions, the oldest instruction in the queue is determined. The status of the instructions in the queue includes whether or not the instruction has been issued for execution as well as whether or not it is known that the issued instruction has been accepted for execution.

If it is known that an issued instruction has not been accepted, the status of the instruction is updated to indicate that the instruction may be re-issued for execution. When an issued instruction that has its status updated to indicate that the instruction may be re-issued is considered to be older than an instruction placed in the non-moving instruction queue after the issued instruction was originally placed therein. When it is known that an issued instruction has been accepted, the instruction is discarded from the non-moving instruction queue.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
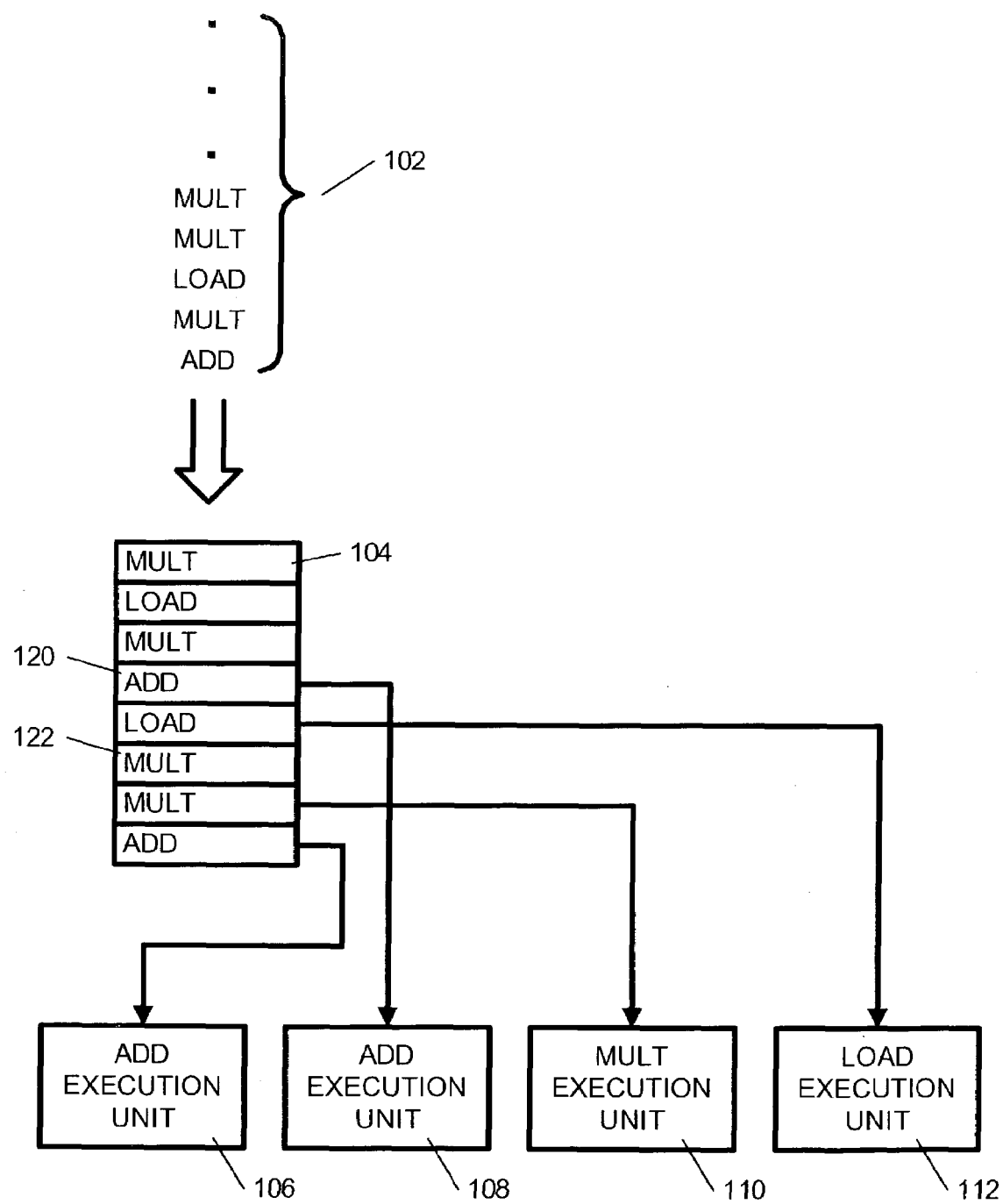
FIG. 1 is a diagram illustrating the operation of an instruction queue.

Turning to the figures, wherein like numbers denote like parts throughout, FIG. 1 is a diagram illustrating the operation of an instruction queue. The diagram includes a plurality of decoded instructions 102, an instruction queue 104 and a plurality of executions units 106, 108 110 and 112. According to the diagram, as the instructions 102 are decoded, they are stored into instruction queue 104.

Each execution unit (i.e., 106, 109, 110 or 112) may be configured to receive one instruction per clock cycle. For example, add execution unit 106 may be configured to receive one add instruction per clock cycle from instruction queue 104. Similarly, add execution unit 108 may also be configured to receive one add instruction per clock cycle, while multiply execution unit 110 and load/store execution unit 112 receive one multiply (i.e., mult) instruction and one load or store instruction per clock cycle, respectively.

As the figure illustrates, the instructions may be issued to execution units 106-112 in an out-of-order fashion. For example, the second oldest add instruction (i.e., add instruction 120) is shown to be issued to add instruction unit 108 before second mult instruction 122, which is older than add instruction 120, is issued to the mult execution unit 110. As will be explained later, instruction queue 104 comprises a control logic that is configured to determine the oldest instruction in the instruction queue 104.

Figure 2:
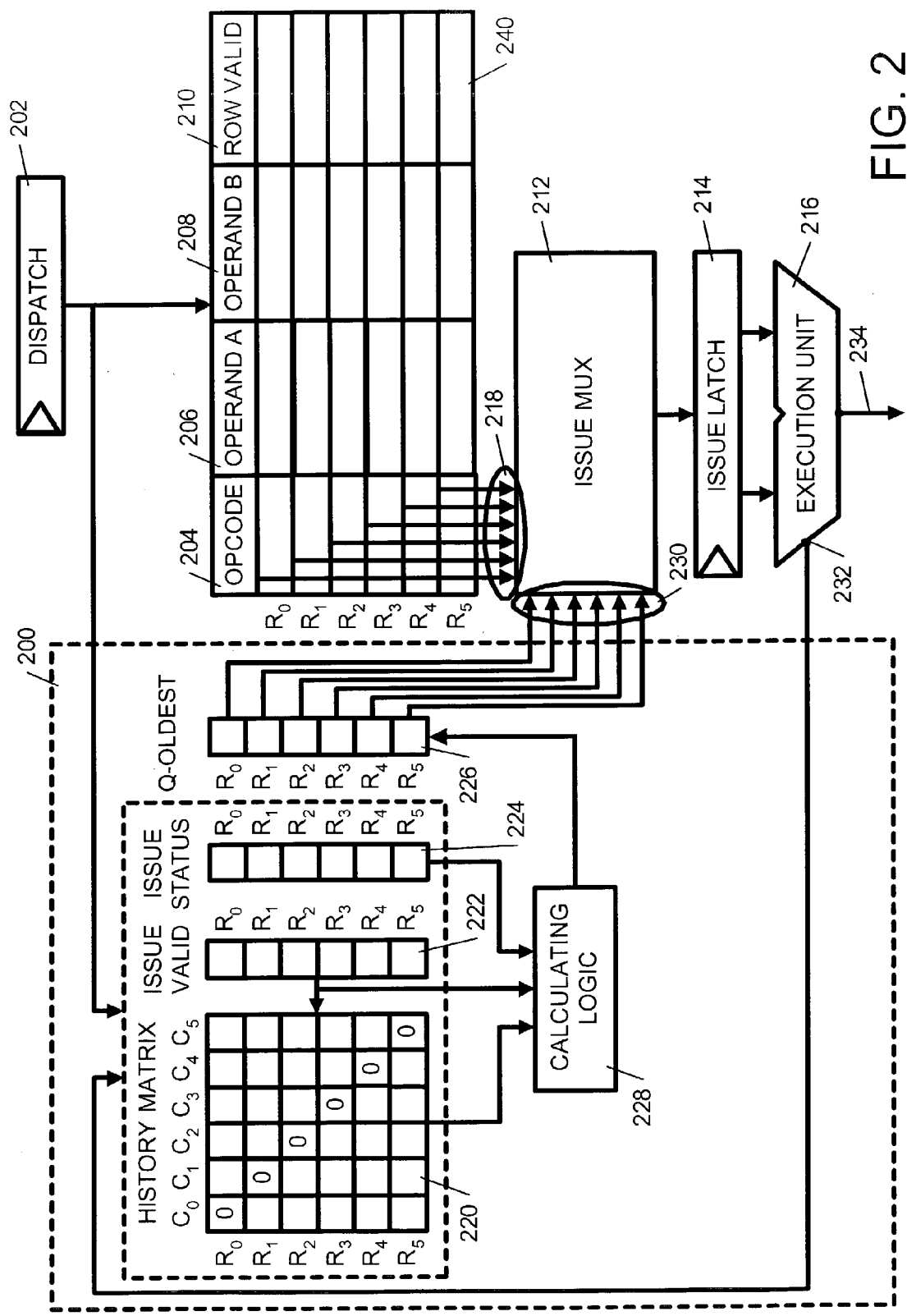
FIG. 2 is a block diagram of a non-moving instruction queue and a control logic circuit that may be used by the invention to quickly determine an oldest instruction in the non-moving instruction queue.

FIG. 2 is a block diagram of a non-moving instruction queue 240 and a control logic circuit 200 that may be used to quickly determine an oldest instruction in the non-moving instruction queue. The non-moving instruction queue 240 is connected to a dispatch circuit 202 and to an issue multiplexer (mux) 212. The issue mux 212 is in turn connected to an issue latch 214, which itself is attached to an execution unit 216.

The dispatch circuit 202 is used to place an instruction into the instruction queue 240 after the instruction has been decoded. Each instruction ordinarily contains an operation code and two operands. The operation code indicates what type of operation is to be conducted on the two operands. For example, in the case where the values of two variables (variables A and B) are to be added together, the operation code will indicate that the operation is an addition and the variables whose values are to be added together are operand A and operand B. Consequently, the instruction queue is divided into a plurality of columns of which, one of them indicates the operation code (i.e., opcode 204) and two of them indicate the operands (i.e., operand A 206 and operand B 208).

The instruction queue 240 also contains one more column, row valid column 210. The row valid column 210 is used to indicate whether an instruction that is in the queue is valid for issuance. Generally, when an instruction is dispatched to the instruction queue 240, a bit in the row valid column 210 is set to a logical one (1), for instance, to indicate that the instruction is valid; and therefore, may be issued for execution. When an issued instruction is accepted by the execution unit 216, the location in which it resides may be de-allocated by having the bit in the row valid column 210 be reset to a logical zero (0), for instance. De-allocating the location in which an issued instruction resides allows for a new instruction to be placed therein.

The scheme of de-allocating the location in which an issued instruction resides only after it has been ascertained that the issued instruction is accepted for execution enhances performance. For example, a processor that does not have this scheme implemented therein may have the issued instruction be overwritten by a newer one in the instruction queue 240 as soon as the instruction is issued. When that happens and the issued instruction is not accepted by the execution unit 216, for whatever reason there may be, the issued but un-accepted instruction may have to be reloaded from the system memory into the instruction cache, re-decoded and re-dispatched to the instruction queue 240 to await issuance. Obviously, this is a much slower procedure than to just reissue an unaccepted instruction.

The issue mux 212 is used to select the oldest instruction in the instruction queue 240 for issuance to the execution unit 216. To illustrate, the mux 212 has N instruction inputs 218, where N is equal to the number of instruction-holding locations or rows in the instruction queue 240. Each input is associated with a row in the instruction queue 240. Further, the issue mux 212 has N selector inputs 230, where N is again the number of rows in the queue. Through the N selector inputs 230, the mux 212 receives N signals from the control logic circuit 200. As will be explained later, one of the N signals enables the mux 212 to select one instruction from the instruction queue 240 that are being fed through the instruction inputs 218. This selected instruction is the oldest one in the queue 240.

The issue latch 214 is used as a synchronization mechanism whereas the execution unit 216 executes the instruction. The execution unit 216 has an instruction output 234 used to provide the result of the execution of the instruction. The execution unit 216 also has a confirmation output 232 connected to the control logic circuit 200. This confirmation output is used to inform the control logic circuit 200 of any issued instruction that has or has not been accepted by the execution unit 216.

Note that according to FIG. 2, there may be as many issue muxes 212 and issue latches 214 as there are execution units 216. Further, for each execution unit, there may be an associated control logic circuit 200. Nonetheless, in certain instances the control logic circuit 200 may be designed to be associated with all the execution units present in a processor. Consequently, having one control logic circuit 200 associated with one execution unit should not be taken as being restrictive to the present invention.

The control logic circuit 200 includes a history matrix 220, an issue valid vector 222, an issue status vector 224 and a Q_oldest vector 226. The history matrix 220 is an N×N (i.e., a square) matrix, whereas the entry vector 222, the issue status vector 224 and the Q_oldest vector 226 are N vectors, where N, in all instances, is equal to the number of rows in the instruction queue 240. All locations in each of the history matrix 220, issue valid vector 222, issue status vector 224 and Q_oldest vector 226 receive or contain only one bit of information.

The diagonal elements (i.e., $R_0C_0$, $R_1C_1$, $R_2C_2$ etc.) of the history matrix 220 are always set to a logical zero (0). In operation, when an instruction is dispatched into the instruction queue 240, the row valid column 210 of the row in which the instruction is placed is set to a logical one (1). Then, the bits in the issue valid vector 222 are transferred into the corresponding row in the history matrix 220. For example, suppose an instruction is placed into row $R_1$ of the instruction queue 240, then the values in locations $R_0$, $R_1$, $R_2$, ... $R_N$ of the issue valid vector 222 will be copied into row $R_1C_i$ (where i=0, 1, 2, ..., N) of the history matrix 220. Of course, $R_1C_1$ will not take on any value from the issue valid vector 222 since it is always set to zero (0). Thus, whatever value would have been written into $R_1C_1$ from the issue valid vector 222 will be discarded.

Once the bits in the issue valid vector 222 are copied into the proper row of the history matrix 220, the bit in the row of the issue valid vector 222 corresponding to the row in which the instruction is placed in the instruction queue 240 is then updated. In the example above, the bit in row $R_1$ of the issue valid vector 222 will accordingly be set to a logical one (1) to indicate that the instruction placed in row $R_1$ of the instruction queue 240 is valid for issuance. Likewise, the bit in row $R_1$ of the issue status vector 224 will be set to one (1) to indicate the present status of the instruction in the instruction queue 240.

Figure 3:
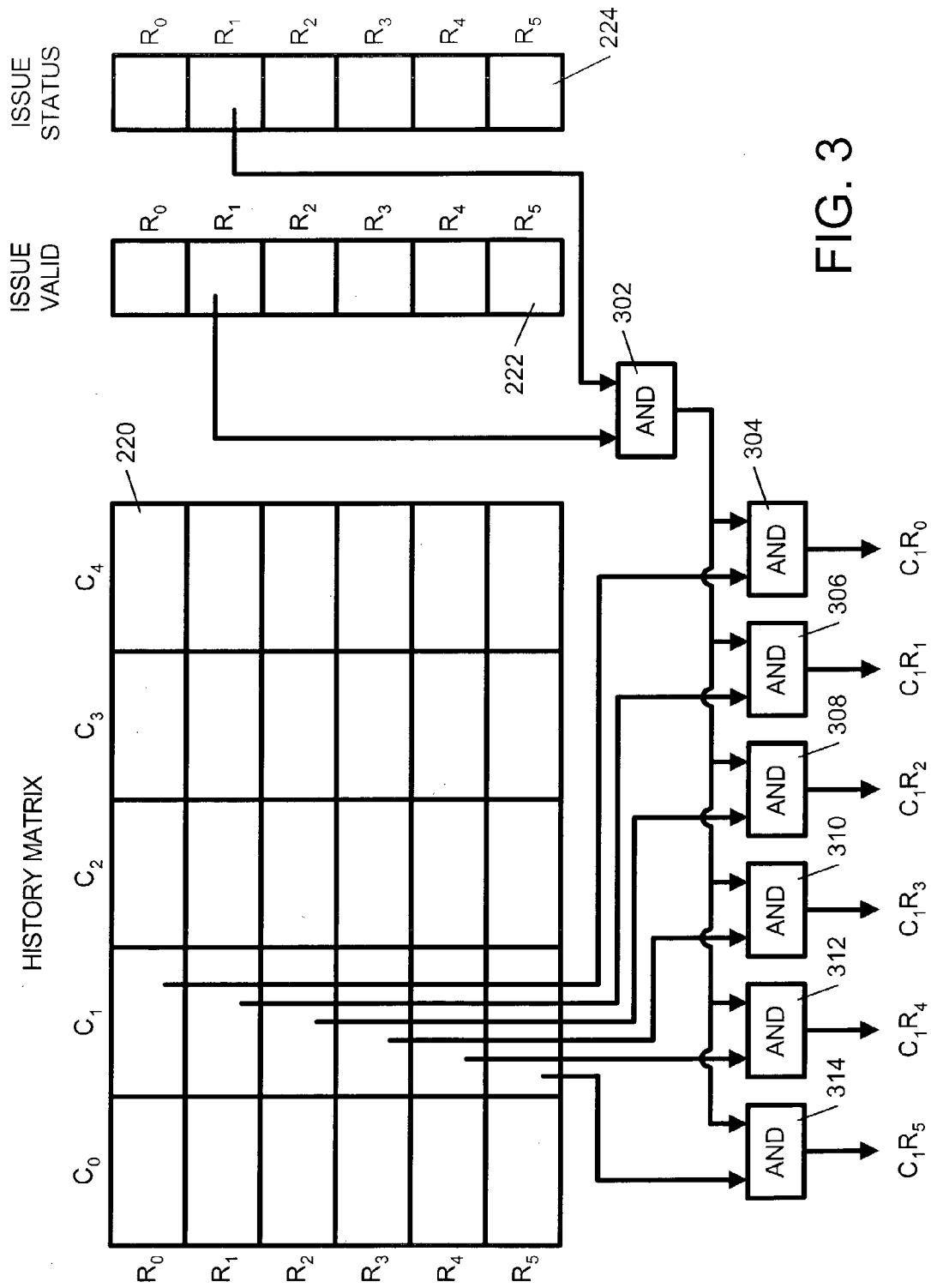
FIG. 3 depicts a portion of a calculating logic.

The bits in both the updated issue valid vector 222 and the updated issue status vector 224 are sent to calculating logic 228 to be processed. FIG. 3 depicts a portion of the calculating logic 228. Specifically, the portion of the calculating logic 228 shown in FIG. 3 consists of a plurality of two-input AND gates (AND gates 302-314). AND gate 302 receives one bit from one row of the issue valid vector 222 and one bit from one corresponding row of the issue status vector 224. The output of the AND gate 302 is sent into another two-input AND gate (e.g., one of AND gates 304-314). The other input of each of the AND gates 304-314 receives a bit from one of the rows in the column that corresponds with the row that is being evaluated. For example, if row $R_1$ is being evaluated, then the bit in row $R_1$ of both the issue valid vector 222 and the issue status vector 224 will be ANDED together using an AND gate 302. The output of the AND gate 302 will be ANDED with the bit in each row in column $C_1R_i$ (i=0, 1, 2, ..., N) of the history matrix 220.

Note that each row is evaluated at each step. That is, the bit in each row of the issue valid vector 222 and the bit in each corresponding row of the issue status vector 224 will be ANDED together using an AND gate 302. The output of each AND gate 302 will be ANDED with the bit of a corresponding column of the history matrix 220 using a set of AND gates 304-314 as described above. Thus, although one set of AND gates 302-314 is shown in FIG. 3, the present invention makes use of N sets of AND gates 302-314, where N is equal to the number of rows in the instruction queue 240.

After all the rows are evaluated, an N×N output matrix will be formed, where N is equal to the number of rows in the instruction queue 240. The bit in each location of the output matrix will first be inverted and then the bits of each row of the inverted output matrix 220 will be ANDED with each other to form an output vector. The bit in each row of the output vector will be ANDED with the bit in the corresponding row of both the issue valid vector 222 and the issue status vector 224. The result is the Q_oldest vector 226.

Note that although a plurality of AND gates are used, the invention is not thus restricted. Any other combinational logic devices may be used to implement the invention, so long as the object of the invention is achieved. Indeed, instead of using AND gates 304-314 to form the output matrix and then invert all the bits in the output matrix, NAND gates may just be used. Hence, the AND gates are used for illustrative purposes only.

In any event, only one of the bits in the Q_oldest vector 226 will contain a logical one (1). This logical one (1) indicates the oldest instruction in the instruction queue 240. The N bits in the Q_oldest vector 226 are the signals transferred to the mux 212 via the N selector inputs 230. Hence, when the N bits of the Q_oldest vector 226 are fed to issue mux 212 via selector inputs 230, the mux 212 will use the one bit set to the logical one (1) to appropriately select the oldest instruction for issuance.

To illustrate, suppose three instructions are entered into the instruction queue 240 in successive clock cycles. Suppose further that the first instruction is entered in row $R_1$, the second instruction in row $R_3$ and the third instruction in row $R_5$. In this example, it will be assumed that the computer system into which the processor is embedded has just been turned on or refreshed and all the vectors (e.g., issue valid vector 222, issue status vector 224 and Q_oldest vector 226) and the history matrix 220 are initialized to zero. It will also be assumed that none of the instructions are issued for execution at any one of the three clock cycles.

Figure 4A:
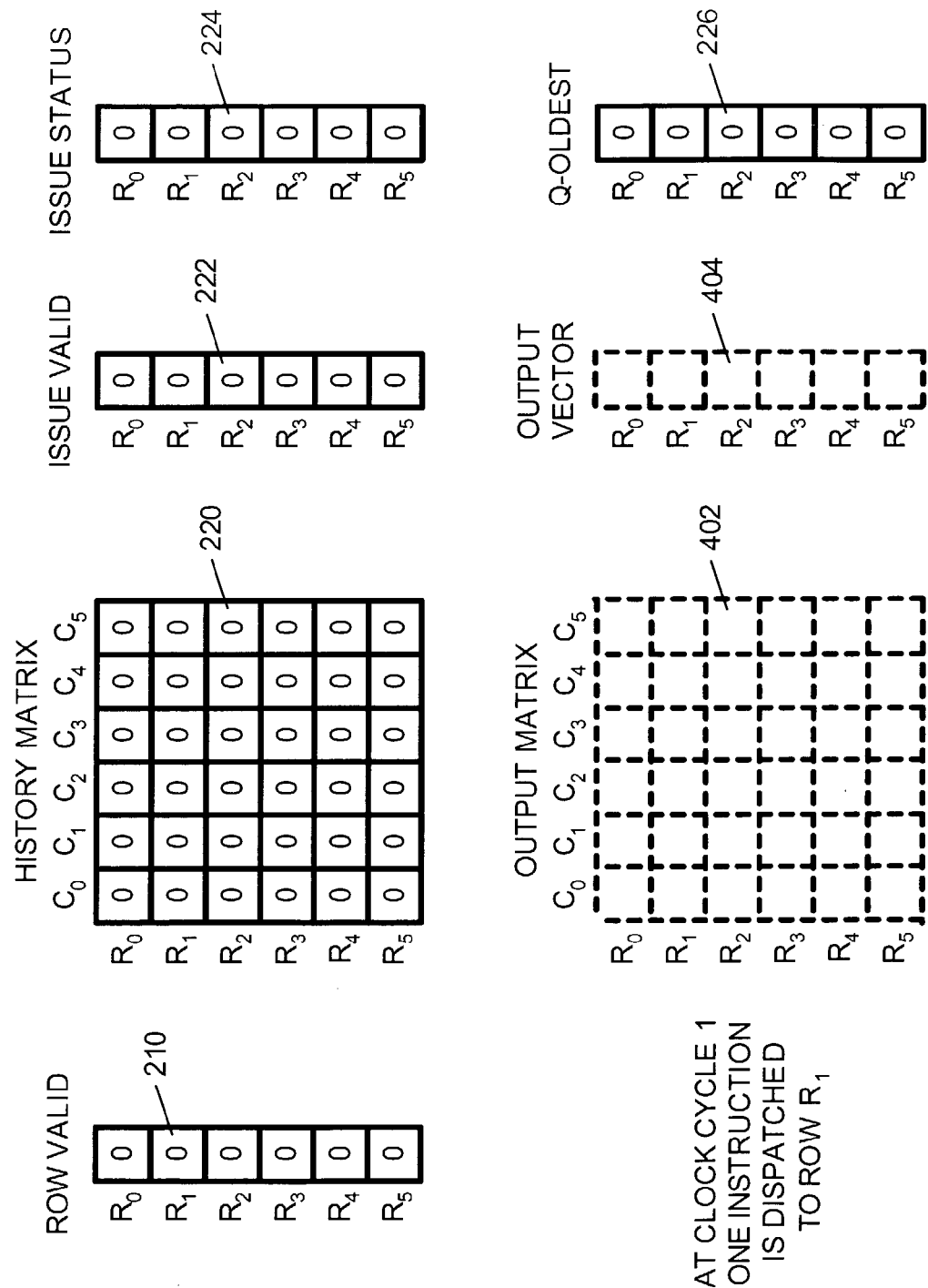
FIG. 4 is a set of examples illustrating the operation of the present invention

Thus, during clock cycle 1 the row valid column 210, issue valid vector 222, issue status vector 224 and Q_oldest vector 226, as well as the history matrix 220 are set to zero (0). This is shown in FIG. 4(a). Output matrix 402 and output vector 404 are shown to be empty since no evaluation is being undertaken. Further, the output matrix 402 and the output vector 404 are drawn in dash lines to emphasize the point that they are only present when the calculating logic 228 shown in FIG. 2 is used.

During clock cycle 1, it is shown that an instruction is dispatched into row $R_1$ of the instruction queue 240. Consequently, at clock cycle 2, the bit in row $R_1$ of the row valid column 210 will be set to a logical one (1) to indicate that the instruction in that location is valid for issuance. Since row $R_1$ is the row under scrutiny, the bits in the issue valid vector 222 in FIG. 4(a) will be copied into row $R_1$ of the history matrix 220 to form the one in FIG. 4(b). Specifically, the bit in row $R_0$ of the issue valid vector 222 in FIG. 4(a) will be copied into location $R_1C_0$ of the history matrix 220 in FIG. 4(a). Likewise, the bits in rows $R_2$, $R_3$, $R_4$ and $R_5$ of the issue valid vector 222 will be copied into locations $R_1C_2$, $R_1C_3$, $R_1C_4$ and $R_1C_5$, respectively, of the history matrix 220 in FIG. 4(a) to form the history matrix in FIG. 4(b). Note that the bit in $R_1$ of the issue valid vector 222 will not be copied since location $R_1C_1$ of the history matrix 220 is always set to zero (0).

Figure 4B:
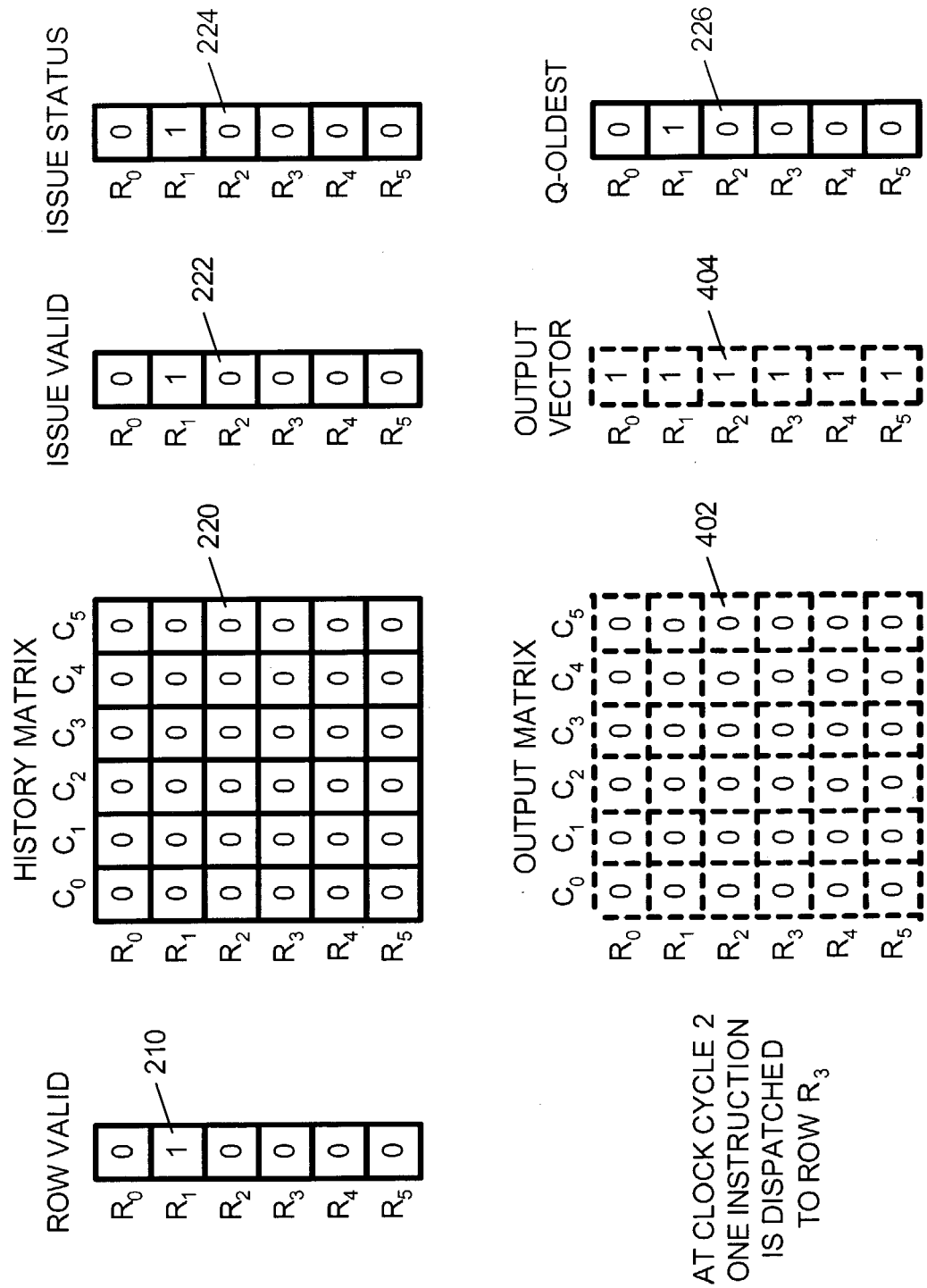

After copying the issue valid vector 222 into the history matrix 220, the issue valid vector 222 will be updated as shown in FIG. 4(b). That is, row $R_1$ of the issue valid vector 222 will now contain a logical one (1). The issue status vector 224 will likewise be updated. Once done, the bit in row $R_0$ of the issue valid vector 222 will be ANDED with the bit in row $R_0$ of the issue status vector 224. The output will be ANDED with the bit in $C_0R_0$, $C_0R_1$, $C_0R_2$, $C_0R_3$, $C_0R_4$ and $C_0R_5$ of the history matrix 220 to form $C_0R_0$, $C_0R_1$, $C_0R_2$, $C_0R_3$, $C_0R_4$ and $C_0R_5$, respectively, of the output matrix 402. Likewise, the bit in row $R_1$ of the issue valid vector 222 will be ANDED with the bit in row $R_1$ of the issue status vector 224 and the result will be ANDED with the bit in each of the locations $C_1R_0$, $C_1R_1$, $C_1R_2$, $C_1R_3$, $C_1R_4$ and $C_1R_5$ of the history matrix 220 to form $C_1R_0$, $C_1R_1$, $C_1R_2$, $C_1R_3$, $C_1R_4$ and $C_1R_5$. The same logical calculations will be done with rows $R_2$-$R_5$ of the issue valid vector 222 and the issue status vector 224 and columns $C_2$-$C_5$ of the history matrix 220 to form the output matrix 402 in FIG. 4(b).

Then, the bit in each location of each row of the output matrix 402 will be inverted and ANDED with each other to form output vector 404. The bit in each row of the output vector 404 will be ANDED with the bit in the corresponding row of the issue valid vector 222 and the bit in the corresponding row of the issue status vector 224 to arrive at the Q_oldest vector 226. As shown by Q_oldest vector 226, the instruction in row $R_1$ of the instruction queue 240 will be the oldest one.

Figure 4C:
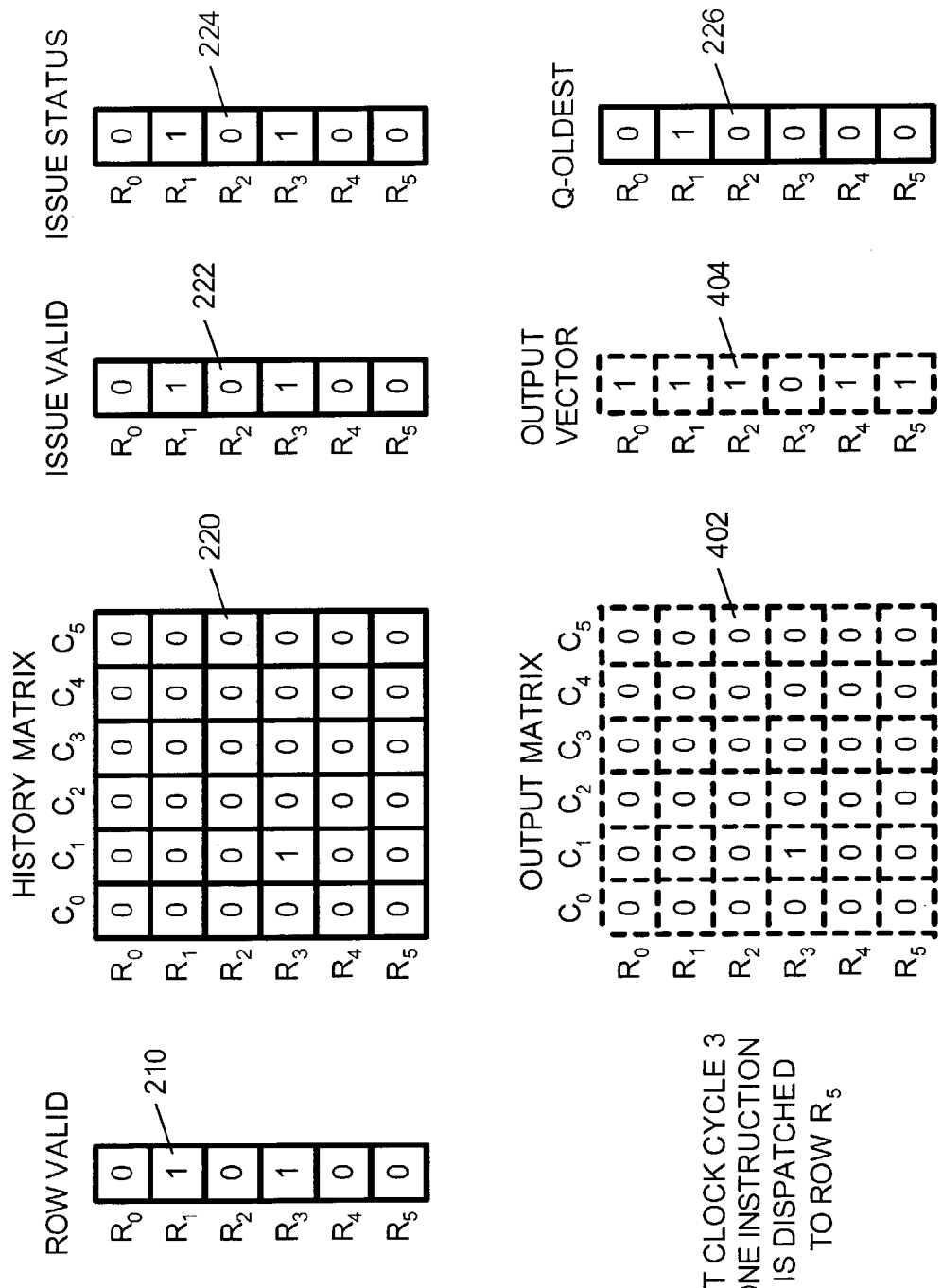

During clock cycle 2, the second instruction is dispatched to row $R_3$ of the instruction queue 240. At this point then, two instructions will be in the instruction queue 240, one in row $R_1$ and the other in row $R_3$. Thus, row valid column 210 in FIG. 4(b) will be updated to form the one shown in FIG. 4(c). The bits of the issue valid vector 222 in FIG. 4(b) will then be copied into row $R_3$ of the history matrix 220 of FIG. 4(b) to form the history matrix in FIG. 4(c). Hence, location $R_3C_1$ of the history matrix 220 will now contain a logical one (1). The bit in row $R_3$ of both the issue valid vector 222 and the issue status vector 224 will then be updated. Then, the bit in row $R_0$ of the issue valid vector 222 and that in row $R_0$ of the issue status vector 224 will be ANDED with each other and with the bit in each of locations $C_0R_0$, $C_0R_1$, $C_0R_2$, $C_0R_3$, $C_0R_4$ and $C_0$ $R_5$ of the history matrix 220 to form $C_0R_0$, $C_0R_1$, $C_0R_2$, $C_0R_3$, $C_0R_4$ and $C_0R_5$, respectively, of the output matrix 402. Likewise, the bits in rows $R_1$, $R_2$, $R_3$, $R_4$ and $R_5$ of the issue valid vector 222 and the bits in corresponding rows $R_1$, $R_2$, $R_3$, $R_4$ and $R_5$ of the issue status vector 224 will be ANDED with each other and with the bits in appropriate columns of the history matrix 220 to form output matrix 402 of FIG. 4(c).

The bits in the output matrix 402 will all be inverted. Then, the bits in each row of the output matrix 402 will be ANDED with each other to form output vector 404 of FIG. 4(c). Here, the content in row $R_3$ of the output vector 404 will be a logical zero (0) because of the logical one (1) in location $C_1R_3$ of the output matrix 402. After ANDING the bit in each row of the issue valid vector 222, the issue status vector 224 and the output vector 404 with each other, the Q_oldest vector 226 will be produced. Quite appropriately, the instruction in row $R_1$ of the instruction queue 240 will be tagged as the oldest one.

Figure 4D:
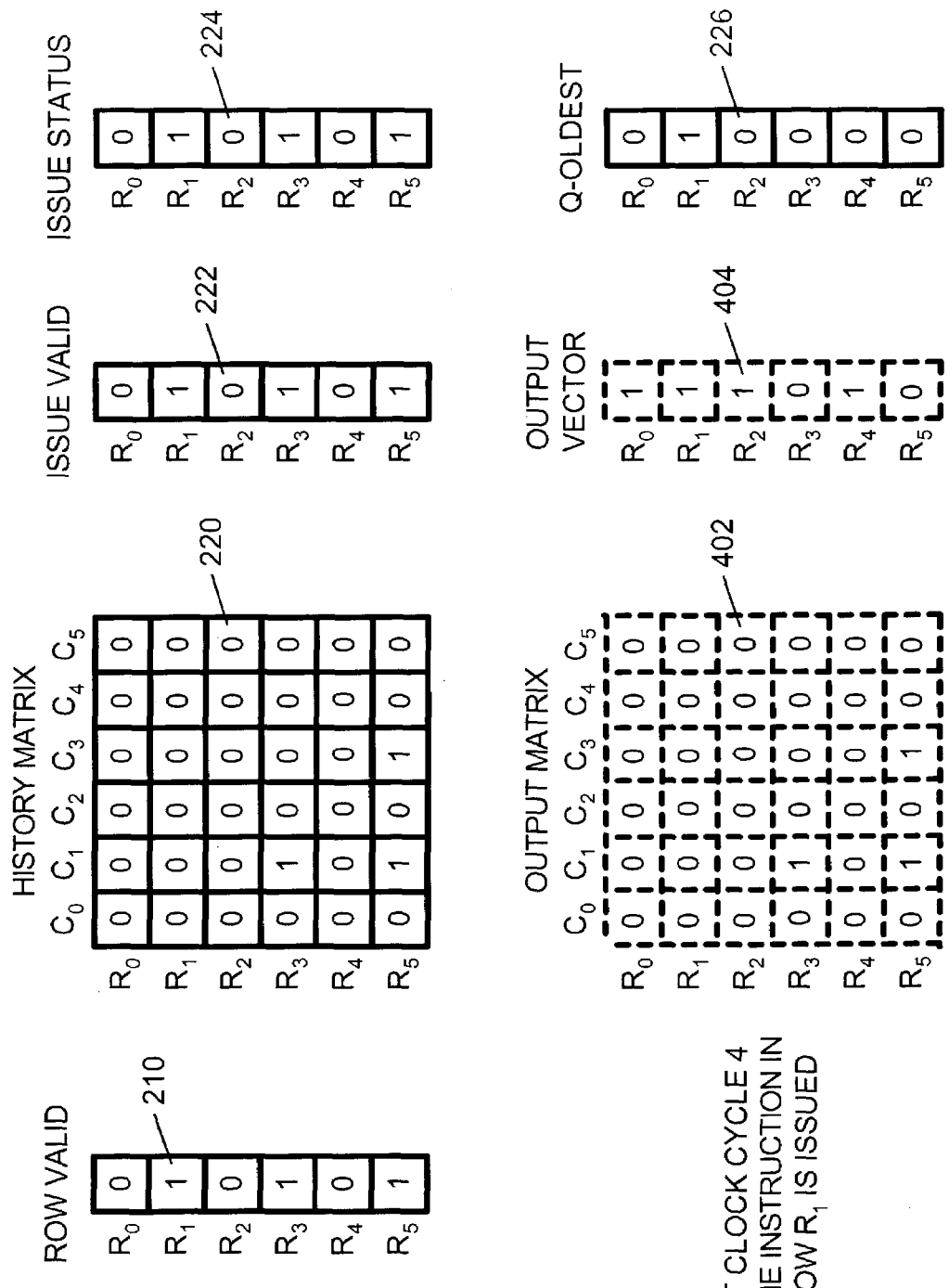

During clock cycle 3, the third instruction is dispatched into row $R_5$ of the instruction queue 240. Accordingly, at clock cycle 4, shown in FIG. 4(d), the row valid column 210 will have a logical one (1) in rows $R_1$, $R_3$ and $R_5$. The bits of the issue valid vector 222 shown in FIG. 4(c), will be copied into row $R_5$ of the history matrix 220. Thus, except for the bit in row $R_5$, the history matrix 220 in FIG. 4(d) will be identical to the history matrix 220 in FIG. 4(c). Next, the bit in row $R_5$ of both the issue valid vector 222 and the issue status vector 224 will accordingly be updated. Then, the bit in each row of the issue valid vector 222 and the issue status vector 224 will be ANDED with each other and with each bit at each location of the corresponding column in the history matrix 220 to produce output matrix 402. Every bit in the output matrix 402 will then be inverted. The inverted bits of each row of the output matrix 402 will be ANDED with each other to form the output vector 404. The bit in each row of the output vector 404 will be ANDED with the bits in each corresponding row of the issue valid vector 222 and the issue status vector 224 to produce the Q_oldest vector 226. Again, the Q_oldest vector 226 in FIG. 4(d) will indicate that the instruction in row $R_1$ of the instruction queue 240 is the oldest one.

Figure 4E:
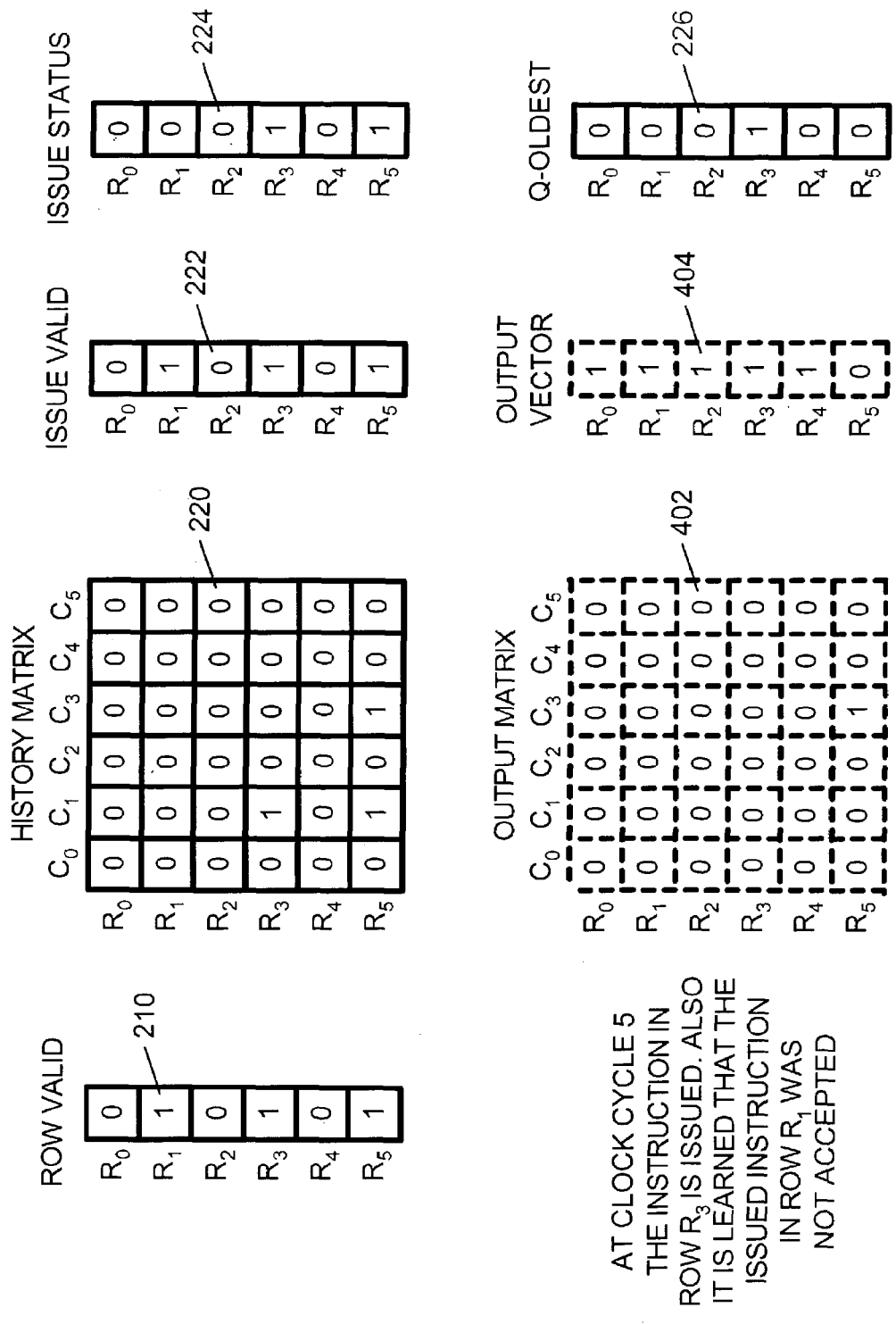

Now, suppose during clock cycle 4, the oldest instruction in the instruction queue 240 (i.e., the instruction in row $R_1$) is issued to execution unit 216. Then during clock cycle 5, the bit in row $R_1$ of the row valid column 210 in FIG. 4(e) will not be reset pending deallocation. Hence, the row valid column 210 in FIG. 4(e) will be identical to that in FIG. 4(d). Since no instruction was dispatched to the instruction queue 240 during clock cycle 4, the history matrix 220 and the issue valid vector 222 in FIG. 4(e) will be identical to those in FIG. 4(d). However, the issue status vector 224 will have the bit in row $R_1$ set to logical zero (0) to indicate the proper status of the instructions in the instruction queue 240.

As before, each bit in each particular row of the issue valid vector 222 will be ANDED with the bit in each respective row of the issue status vector 224 and with each bit in each corresponding column of the history matrix 220 to form output matrix 402. The bit in each location of the output matrix 402 will then be inverted. Next, the bits in each row of the output matrix 402 will be ANDED with each other to form the output vector 404. Finally, the bit in each row of the output vector 404 will be ANDED with the bit in each corresponding row of the issue valid vector 222 and the issue status vector 224 to form the Q_oldest vector 226. In this case, the Q_oldest vector 226 will indicate that the oldest instruction in the queue 240 is the instruction in row $R_3$.

Let us suppose further that during clock cycle 5, the instruction in row $R_3$ is issued while it was learned through a signal from confirmation output 232 that the instruction, which was issued earlier to the execution unit 216 (i.e., the instruction in row $R_1$), is not accepted. Then, during clock cycle 6 the row valid 210 in FIG. 4(f) will remain identical to the one in FIG. 4(e) since there has not been any de-allocation nor has there been any instruction dispatched to the instruction queue 240. Likewise, the history matrix 220 and the issue valid vector 222 in FIG. 4(f) will remain identical to those in FIG. 4(e).

Figure 4F:
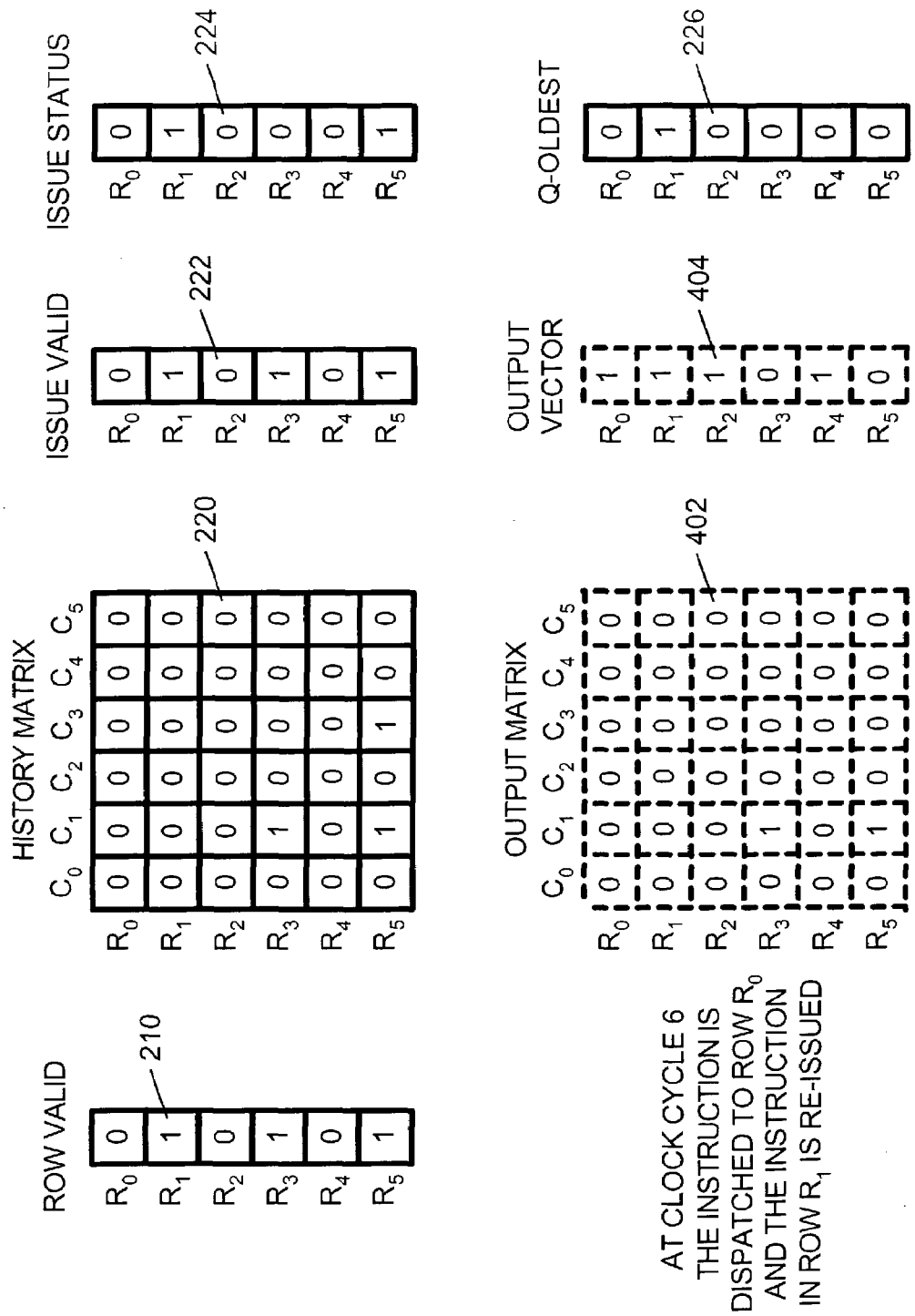

However, the bit in row $R_1$ of the issue status vector 224 will be reset to a logical one (1) to indicate that the instruction in row $R_1$ of the instruction queue 240 is ready to be re-issued. Further, since the instruction in row $R_3$ of the instruction queue 240 has been issued to the execution unit 216, then the bit in row $R_3$ of the issue status vector 224 will be set to zero (0). Consequently, the issue status vector 224 will be as shown in FIG. 4(f).

As usual, each row of the issue valid vector 222 and the issue status vector 224 will be ANDED with each other and with the bits in each corresponding column of the history matrix 220 to form the output matrix 402. After inverting each bit in the output matrix 402 and ANDING the bits in each row of the output matrix 402 with each other, the output vector 404 will be produced. Then, the bit in each row of the issue valid vector 222, the issue status vector 224 and the output vector 404 will be ANDED together to generate the Q_oldest vector 226. Here, since the previously issued instruction in row $R_1$ of the instruction queue 240 was not accepted, the Q_oldest vector will indicate that it is now the oldest instruction in the queue 240.

Figure 4G:
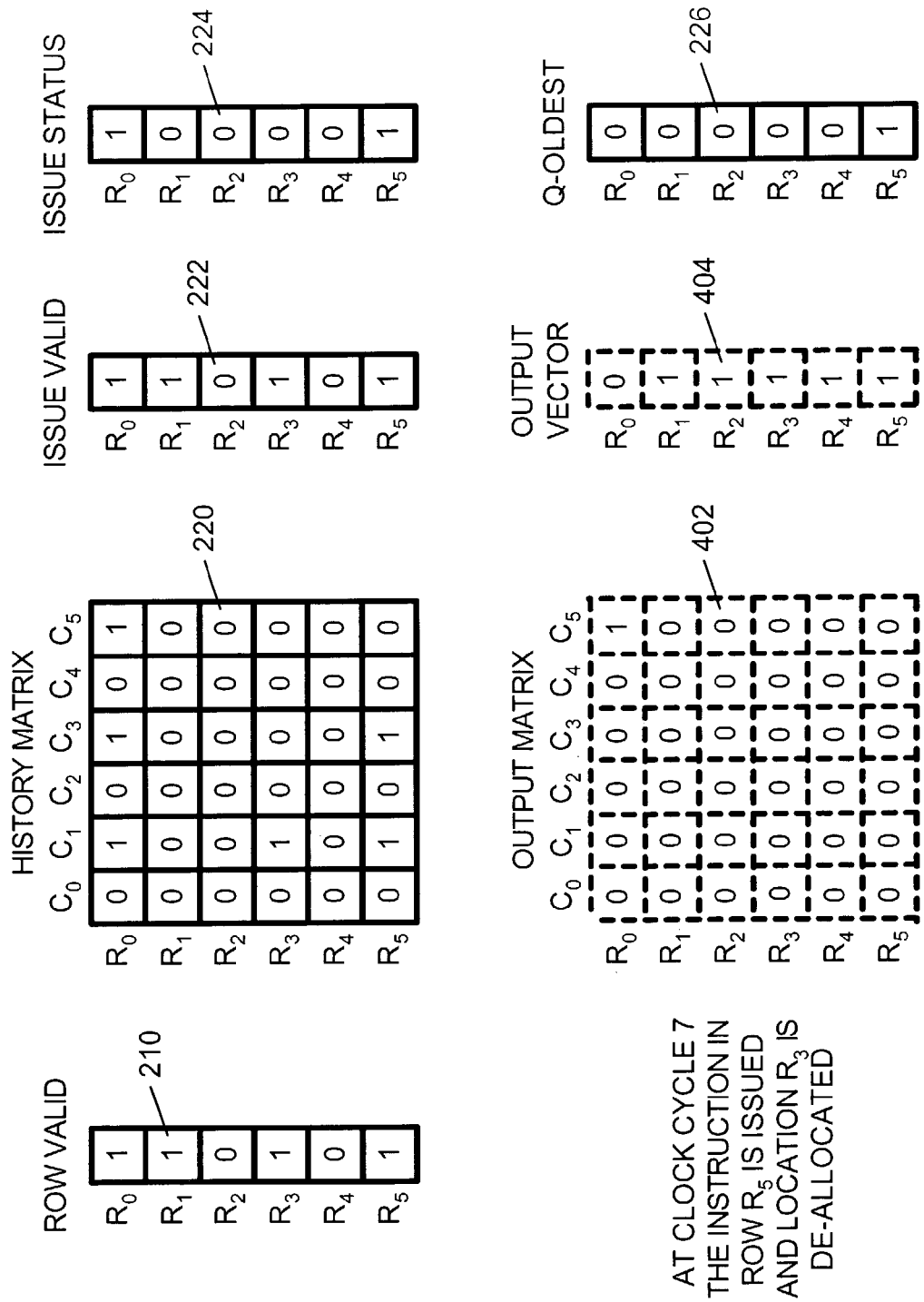
Figure 4H:
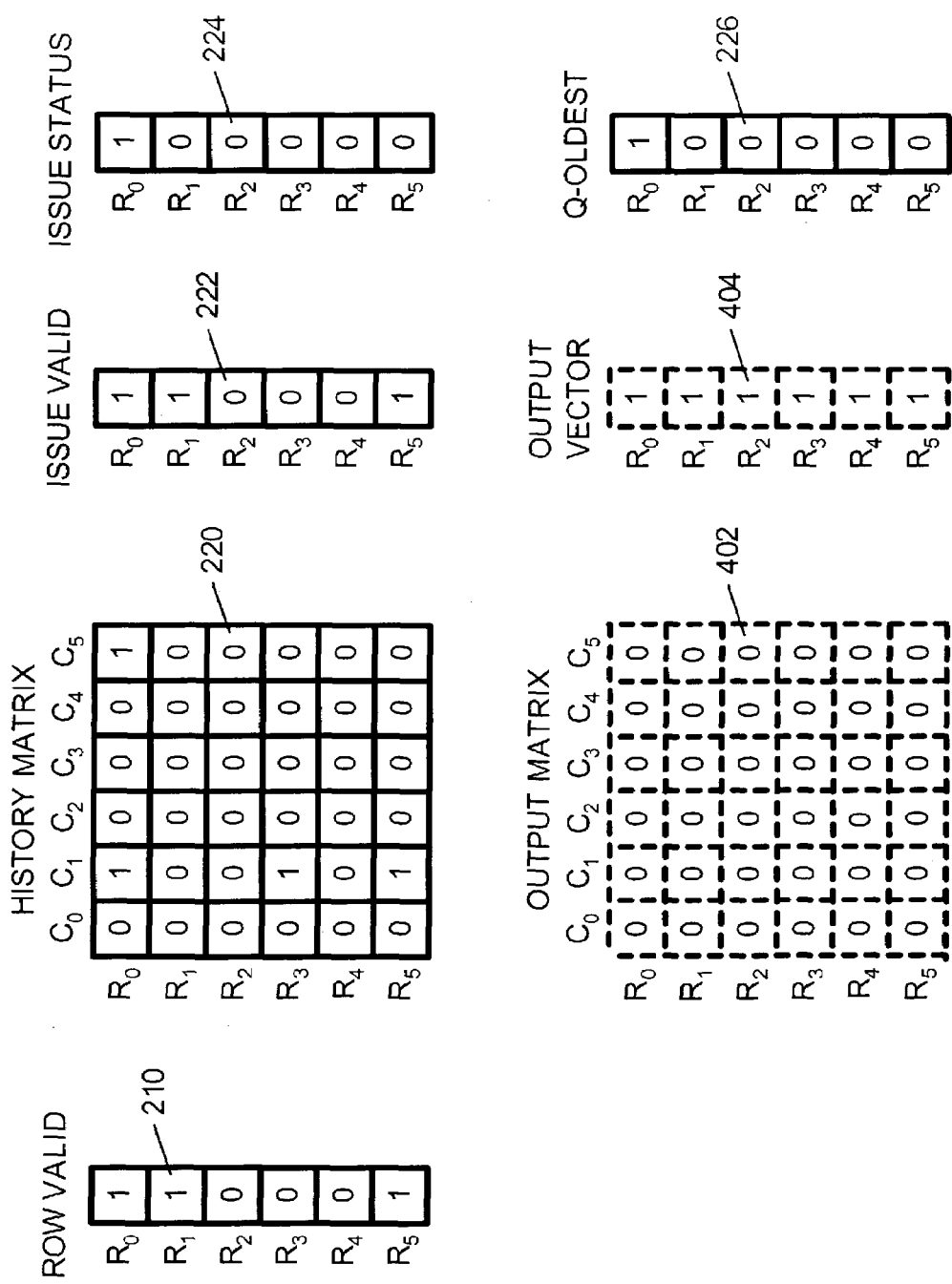
Figure 5A:
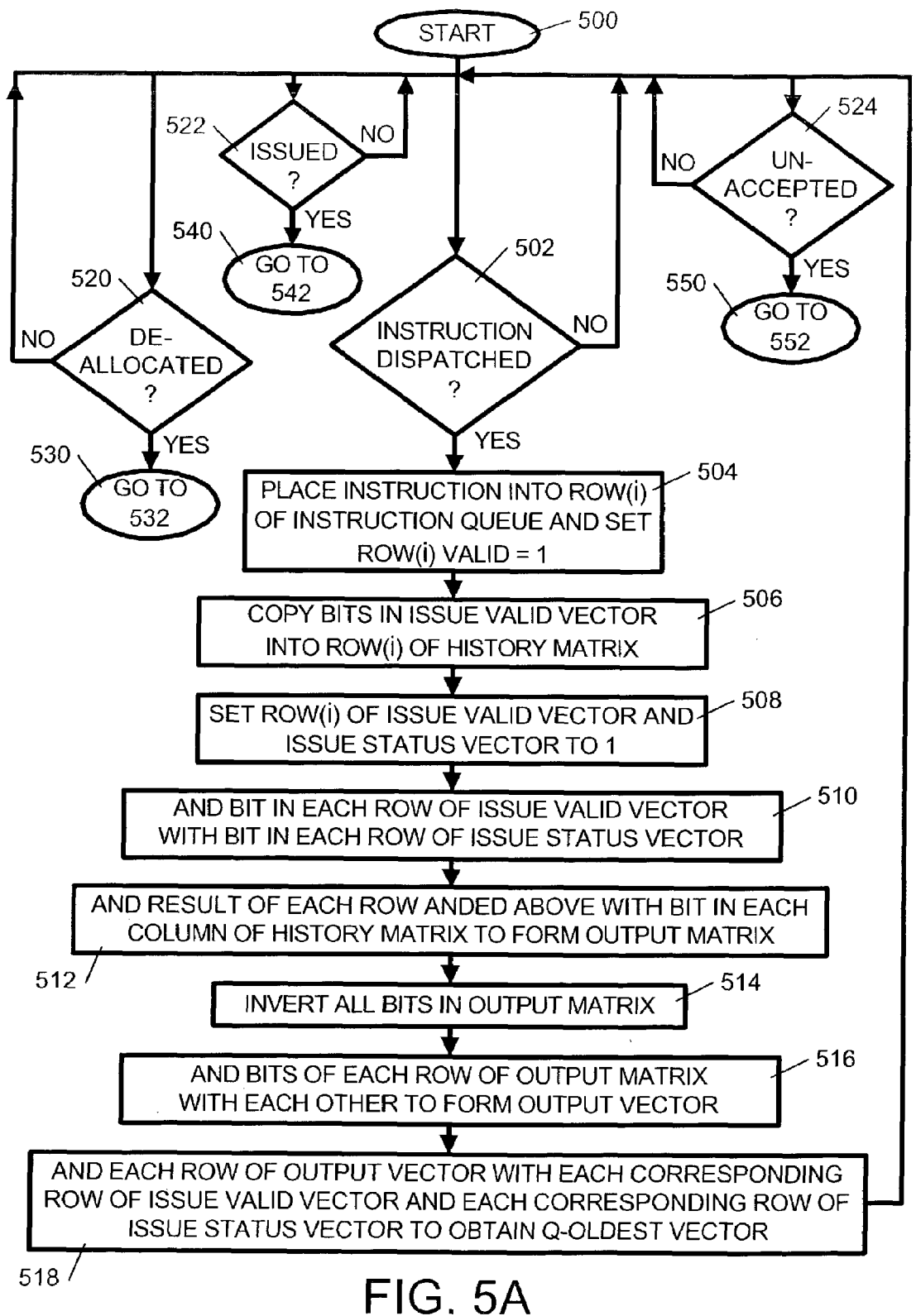
FIG. 5 is a flow chart of a process that may be used by the present invention.
Figure 5B:
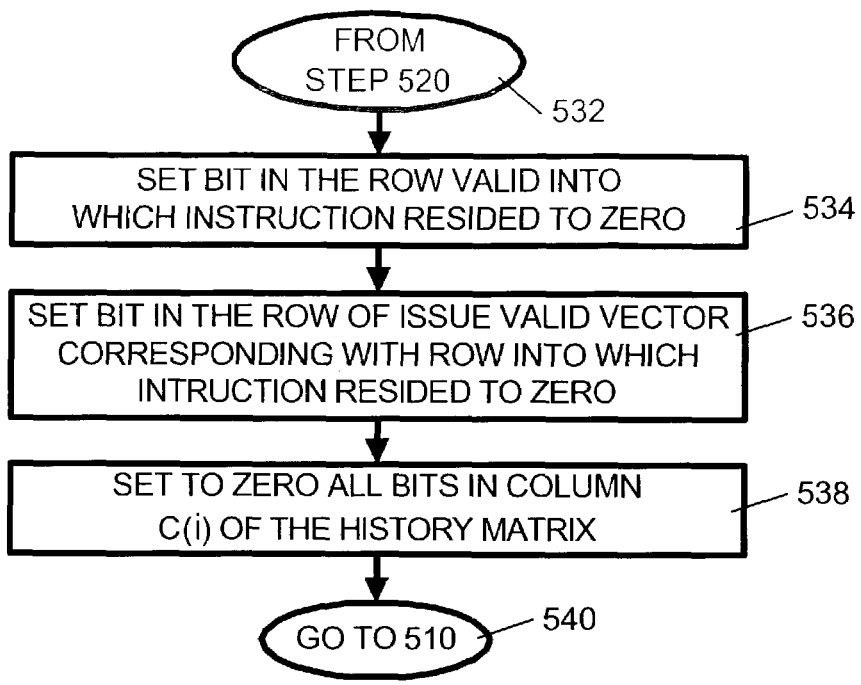
Figure 5C:
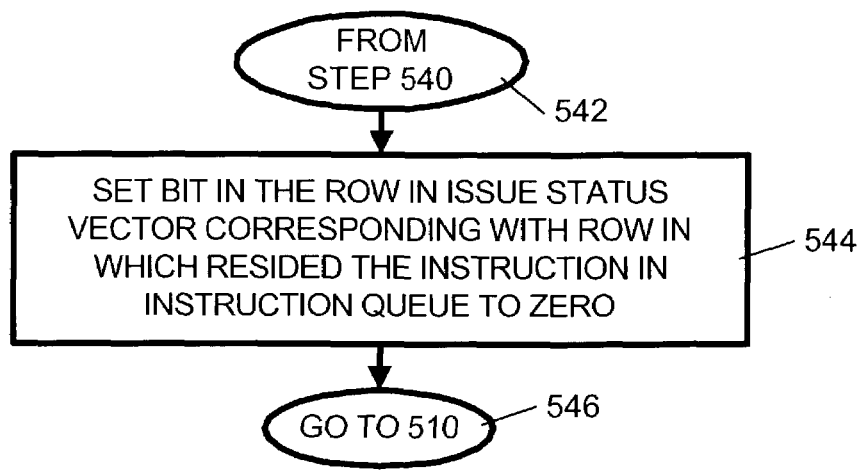
Figure 5D:
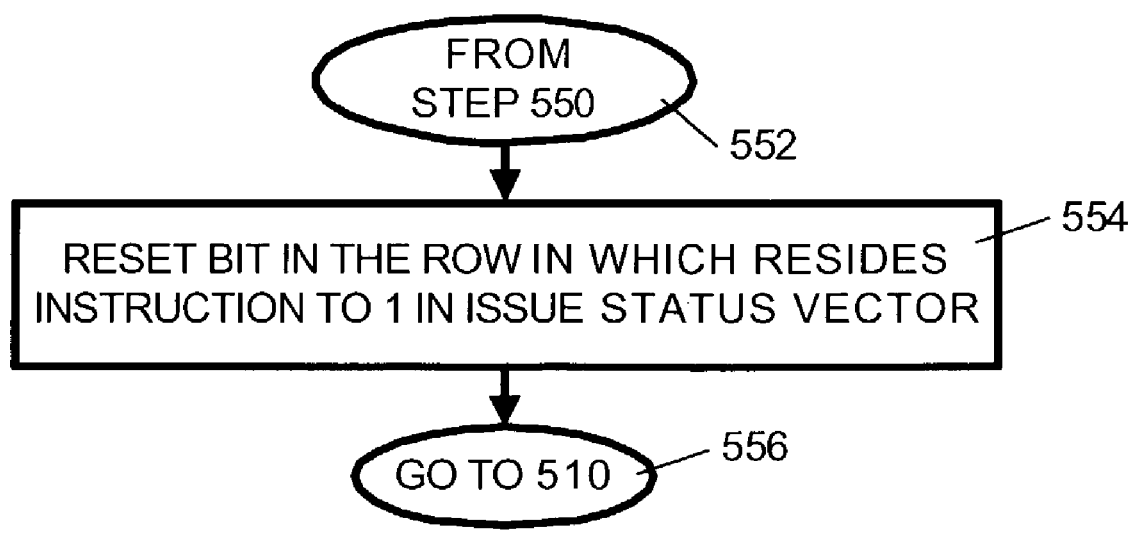

If, for instance, during clock cycle 6 an instruction is dispatched into row $R_0$ of the instruction queue 240 while the instruction in row $R_1$ is re-issued to execution unit 216, then the row valid column 210 will be as shown in FIG. 4(g). That is, row $R_0$ of the row valid 210 shown in FIG. 4(f) will be set to a logical one (1) to change into the one shown in FIG. 4(g). The bits of the issue valid vector 222 in FIG. 4(f) will be copied into row $R_0$ of the history matrix 220 in FIG. 4(f) to form the history matrix 220 shown in FIG. 4(g). Then, the bit in row $R_0$ of the issue valid vector 222 in FIG. 4(f) will be set to a logical one (1). The bit in row $R_0$ of the issue status vector 224 of FIG. 4(f) will also be set to a logical one (1); but, the bit in row $R_1$ of FIG. 4(f) will be set to logical zero (0). The result is shown as the issue status vector 224 shown in FIG. 4 (g).

To form the output matrix 402, the bit in each particular row of the issue valid vector 222 and the bit in each corresponding row of the issue status vector 224 will be ANDED together and with the bits in each corresponding column of the history matrix 220 in FIG. 4(g). After the output matrix 402 is produced, all the bits will be inverted. The inverted bits of each row will then be ANDED with each other to form the output vector 404. The bit in each row of the output vector 404 will be ANDED with the corresponding row of the issue valid vector 222 and the issue status vector 224 to form Q_oldest vector 226. Here, the instruction in row $R_5$ of the instruction queue will be tagged as the oldest one.

As one more example, let's suppose that during clock cycle 7 the instruction in row $R_5$ of the instruction queue 240 is issued and row $R_3$ is de-allocated, allowing for a new instruction to be placed therein. Then, the bit in row $R_3$ of the row valid column 210 of FIG. 4(g) will be set to zero (0), as shown in the row valid column 210 in FIG. 4(h) to indicate that a new instruction may be placed therein. The bits in the issue valid vector 222 of FIG. 4(g) will not be copied into the history matrix 220 since there was not an instruction dispatched into the instruction queue 240. However, all bits that were set to logical one (1) in column $C_3$ of the history matrix 220 will be reset to zero (0) since row $R_3$ is now de-allocated.

The bit in row $R_3$ of the issue valid vector 222 in FIG. 4 (g) will be set to zero to indicate that any instruction in this row in the instruction queue 240 is not valid for issuance. The bit in row $R_5$ of the issue status vector 224 in FIG. 4(g) will be set to zero (0) to indicate the present status of the instructions in the instruction queue 240. The bits in both issue valid vector 222 and issue status vector 224 will be as shown in FIG. 4(h).

The bit in each row of the issue valid vector 222 and in each row of the issue status vector 224 will be ANDED together and with each bit in corresponding columns of the history matrix 220 to form the output matrix 402. All the bits in the output matrix 402 will then be inverted. Next, the inverted bits in each row of the output matrix 402 will be ANDED with each other to form the output vector 404. Finally, the bits in each row of the output vector 404, the issue valid vector 222 and the issue status vector 224 will be ANDED together to form the Q_oldest vector 226. This vector will indicate that the instruction in row $R_0$ of the instruction queue 240 is now the oldest.

FIG. 5 is a flow chart of a process that may be used in a processor to implement the invention. The process starts right after the computer in which the processor is embedded is turned on or is refreshed (step 500). When that occurs the process enters a checking stage. In that stage, four checks will continuously be made at each succeeding clock cycle. The four checks include: (1) whether any row in the instruction queue was de-allocated (step 520), (2) whether any instruction in the instruction queue was issued (step 522), (3) whether an instruction was dispatched into the instruction queue (step 502) and (4) whether an issued instruction was not accepted by the execution unit to which it was issued (step 524).

Let us explore the case where an instruction was dispatched to the queue in the previous clock cycle (i.e., step 502). Then, in step 504, the row valid column of the row in which the instruction was placed will be set to a logical one (1). Next, the bits from the issue valid vector will be copied into the row of the history matrix corresponding to the row in which the instruction was placed (step 506). Then, the bit in the row corresponding to the one in which the instruction was placed of both the issue valid vector and the issue status vector will be updated (step 508).

In step 510, the bit in each row of the issue valid vector will be ANDED with the bit in the corresponding row of the issue status vector. The result of each AND operation in step 510 will be ANDED with the bit in each location of a column of an N×N history matrix corresponding to the row of the issue valid vector that was ANDED with the issue status vector (i.e., if the bit of row $R_1$ of the issue valid vector was ANDED with the bit in row $R_1$ of the issue status vector then the bits in column $C_1$ of the matrix will be used). Doing so will produce an N×N output matrix, N in both instances being equal to the number of instruction-holding locations or rows in the instruction queue (step 512).

In step 514, all the bits of the output matrix are inverted. The inverted bits of each row of the output matrix are ANDED with each other to produce an output vector (step 516). The bit in each row of the output vector will then be ANDED with the bit in each corresponding row of both the issue valid vector and the issue status vector to generate the Q_oldest vector (step 518) and the process returns to the checking stage.

If a row was de-allocated during the previous clock cycle (step 520), then the process will jump to step 532 (step 530). Then, the bit in the row of the row valid column of the instruction queue in which the instruction resided will be set to zero. The bit in the row of the issue valid vector that corresponds to the row in the row valid column will also be set to zero. Further, all bits in the history matrix column corresponding to the row that has been de-allocated will be set to logical zero (0). Next, the process will jump to step 510 (steps 534, 536, 538 and 540).

If an instruction was issued during the previous clock cycle (step 522), then the process will jump to step 542 (step 540). Then, the bit in the row of the issue status vector that corresponds to the row in which the issued instruction resides in the instruction queue will be set to zero. Next, the process will jump to step 510 (steps 544 and 546).

If an issued instruction was not accepted in the previous clock cycle (step 524), then the process will jump to step 552 (step 550). Then, the bit in the row of the issue status vector that corresponds to the row in which the issued instruction resides in the instruction queue will be set to one (1). Next, the process will jump to step 510 (steps 554 and 556).

Note that at any previous clock cycle, one, a few or all of the instances for which the invention tests for may have occurred. When that occurs, the process will simultaneously proceed through one, a few or all the four different paths disclosed above until step 510 is reached. At that point, the different paths will be merged into one where the process will continue until it goes back to the checking stage.

Figure 6:
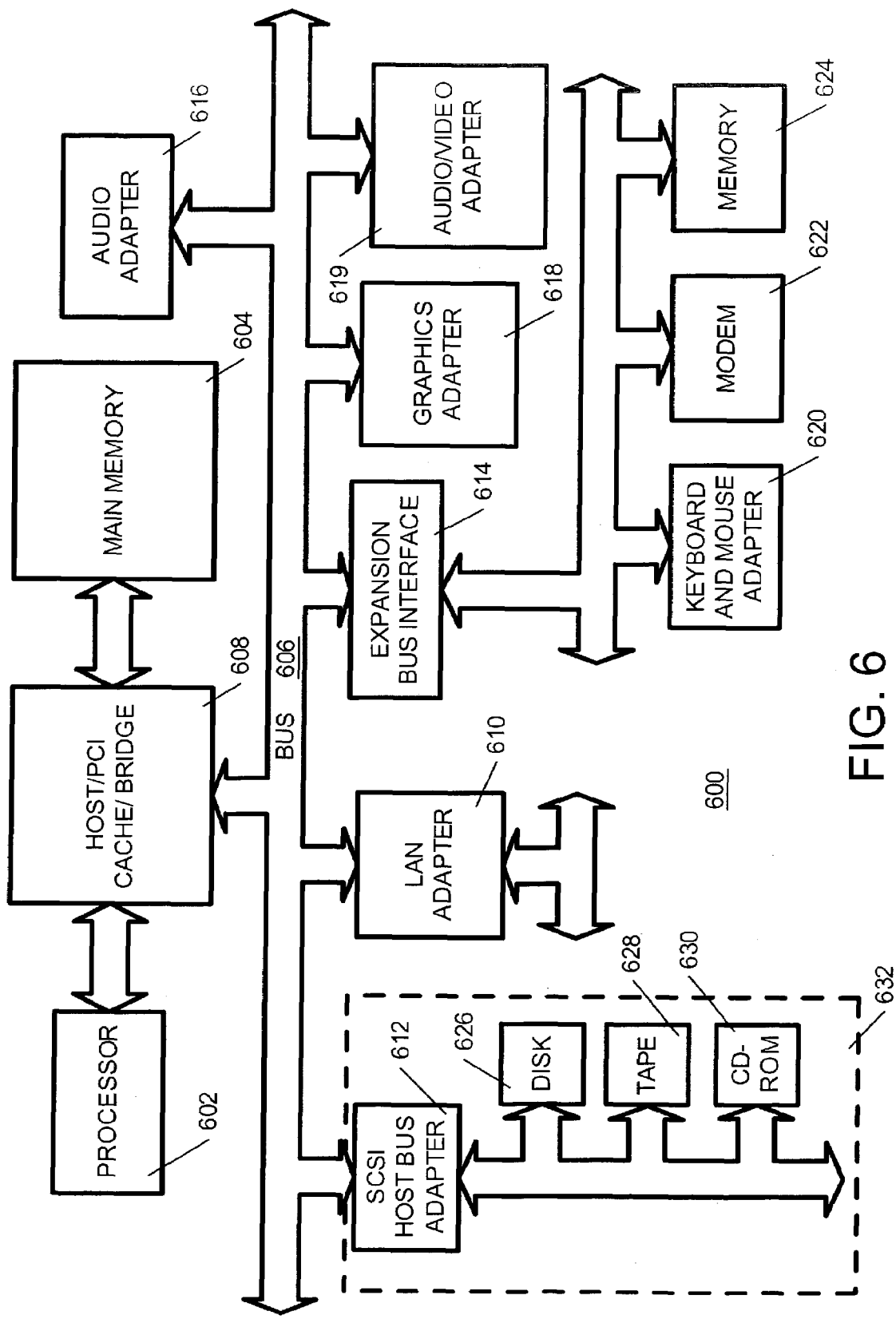
FIG. 6 is a block diagram of a computing system into which the invention may be implemented.

FIG. 6 is a block diagram of a data processing system on which the invention may be executed. Data processing system 600 employs a peripheral component interconnect (PCI) local bus architecture. Although the depicted example employs a PCI bus, other bus architectures such as Accelerated Graphics Port (AGP) and Industry Standard Architecture (ISA) may be used. Processor 602 and main memory 604 are connected to PCI local bus 606 through PCI bridge 608. PCI bridge 608 also may include an integrated memory controller and cache memory for processor 602. Additional connections to PCI local bus 606 may be made through direct component interconnection or through add-in boards. In the depicted example, local area network (LAN) adapter 610, SCSI host bus adapter 612, and expansion bus interface 614 are connected to PCI local bus 606 by direct component connection. In contrast, audio adapter 616, graphics adapter 618, and audio/video adapter 619 are connected to PCI local bus 606 by add-in boards inserted into expansion slots. Expansion bus interface 614 provides a connection for a keyboard and mouse adapter 620, modem 622, and additional memory 624. Small computer system interface (SCSI) host bus adapter 612 provides a connection for hard disk drive 626, tape drive 628, and CD-ROM drive 630. Typical PCI local bus implementations will support three or four PCI expansion slots or add-in connectors.

An operating system runs on processor 602 and is used to coordinate and provide control of various components within data processing system 600 in FIG. 6. The operating system may be a commercially available operating system, such as Windows XP, which is available from Microsoft Corporation. An object oriented programming system such as Java may run in conjunction with the operating system and provide calls to the operating system from Java programs or applications executing on data processing system 600. "Java" is a trademark of Sun Microsystems, Inc. Instructions for the operating system, the object-oriented operating system, and applications or programs are located on storage devices, such as hard disk drive 626, and may be loaded into main memory 604 for execution by processor 602.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6. Also, the processes of the present invention may be applied to a multiprocessor data processing system.

The depicted example in FIG. 6 is not meant to imply architectural limitations. For example, data processing system 600 may also be a notebook computer or hand held computer. Data processing system 600 also may be a kiosk or a Web appliance. In any case, the invention may be stored in any memory device employed by the data processing system 600.

The description of the present invention has been presented for purposes of illustration and description, and is not intended to be exhaustive or limited to the invention in the form disclosed. Many modifications and variations will be apparent to those of ordinary skill in the art. Thus, the embodiment was chosen and described in order to best explain the principles of the invention, the practical application, and to enable others of ordinary skill in the art to understand the invention for various embodiments with various modifications as are suited to the particular use contemplated. However, the invention is not restricted to the described embodiment.

What is claimed is:

1. A method for quickly determining an oldest instruction in a non-moving instruction queue of a processor comprising the steps of:

storing instructions, one at a time, in the non-moving queue, the instructions being each stored at a clock cycle;

recording statuses of the instructions in the non-moving instruction queue at each clock cycle in a history matrix, the statuses including statuses of instructions that were issued for execution but did not get accented to be executed and were not discarded from the non-moving queue; and determining, using a present status of the instructions and previously recorded statuses of the instructions in the history matrix, the oldest instruction in the non-moving instruction queue.

2. The method of claim 1 wherein if an issued instruction has not been accepted, the status of the instruction is updated to indicate that the instruction may be re-issued for execution.

3. The method of claim 2 wherein an issued instruction that has its status updated to indicate that the instruction may be re-issued is considered to be older than an instruction placed in the non-moving instruction queue after the issued instruction was originally placed in the non-moving queue.

4. The method of claim 2 wherein an issued instruction is discarded from the non-moving instruction queue when it has been accented for execution.

5. A computer system comprising:

at least one processor, the processor having a non-moving instruction queue for storing instructions for execution, the instructions being stored one at a time at a clock cycle;

at least one storage device for storing statuses of the instructions in the non-moving instruction queue at each clock cycle in a history matrix, the statuses including statuses of instructions that were issued for execution but did not get accepted to be executed and were not discarded from the non-moving queue; and logic devices for determining, using a present status of the instructions and previously recorded statuses of the instructions in the history matrix, the oldest instruction in the non-moving instruction queue.

6. The computer system of claim 5 wherein if an issued instruction has not been accepted, the status of the instruction is updated to indicate that the instruction may be re-issued for execution.

7. The computer system of claim 6 wherein an issued instruction that has its status updated to indicate that the instruction may be re-issued is considered to be older than an instruction placed in the non-moving instruction queue after the issued instruction was originally placed in the non-moving queue.

8. The computer system of claim 6 wherein an issued instruction is discarded from the non-moving instruction queue when it is accepted for execution.

\* \* \* \* \*